US008923762B2

(12) United States Patent
Chan et al.

(10) Patent No.: US 8,923,762 B2
(45) Date of Patent: Dec. 30, 2014

(54) COMMUNICATION DEVICE WITH SIMULTANEOUS WIRELESS LAN AND BLUE-TOOTH COMMUNICATION CAPABILITY

(75) Inventors: Ka-Un Chan, Zhubei (TW); Yi-Shao Chang, Kaohsiung (TW); Yi-Chang Shih, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 249 days.

(21) Appl. No.: 13/559,090

(22) Filed: Jul. 26, 2012

(65) Prior Publication Data
US 2013/0029601 A1 Jan. 31, 2013

(30) Foreign Application Priority Data

Jul. 27, 2011 (TW) .............................. 100126523 A

(51) Int. Cl.
*H04B 5/00* (2006.01)
*H04W 88/06* (2009.01)
(52) U.S. Cl.
CPC ..................................... *H04W 88/06* (2013.01)
USPC .......................... 455/41.1; 455/41.2; 455/41.3
(58) Field of Classification Search
CPC ........................................................ H04B 1/005
USPC ............................................... 455/41.1–41.3
See application file for complete search history.

(56) References Cited

U.S. PATENT DOCUMENTS

| 8,463,199 | B2 * | 6/2013 | Sugar et al. ..................... 455/73 |
| 2007/0060055 | A1 * | 3/2007 | Desai et al. ................. 455/41.2 |
| 2008/0043705 | A1 | 2/2008 | Desai et al. |
| 2008/0045152 | A1 | 2/2008 | Boes |
| 2008/0192806 | A1 | 8/2008 | Wyper et al. |

FOREIGN PATENT DOCUMENTS

CN 1893299 A 1/2007

* cited by examiner

*Primary Examiner* — Tuan H Nguyen
(74) *Attorney, Agent, or Firm* — Birch, Stewart, Kolasch & Birch, LLP

(57) ABSTRACT

A communication device is disclosed, having a wireless LAN transceiver, a wireless LAN demodulation circuit, a Bluetooth transceiver, a Bluetooth demodulation circuit, an oscillator, and a mixer. The wireless LAN transceiver conducts communication in a first frequency band and the wireless LAN demodulation circuit demodulates the wireless LAN signals. The Bluetooth transceiver conducts communication in a second band and a third frequency band, which are higher and lower than the first frequency band, respectively. The oscillator generates oscillating signals. The mixer mixes the signals in the second frequency band with an oscillating signal, which is higher than the second frequency band, and mixes the signals in the third frequency band with another oscillating signal, which is lower than the third frequency band to generate mixed signals. The Bluetooth demodulation circuit demodulates the mixed signals of the mixer.

18 Claims, 3 Drawing Sheets

COMMUNICATION DEVICE WITH SIMULTANEOUS WIRELESS LAN AND BLUE-TOOTH COMMUNICATION CAPABILITY

CROSS-REFERENCE TO RELATED APPLICATIONS

This application claims the benefit of priority to Taiwanese Patent Application No. 100126523, filed on Jul. 27, 2011; the entirety of which is incorporated herein by reference for all purposes.

BACKGROUND

The disclosure generally relates a communication device.

Along with the progress of communication technology, more and more electronic devices are equipped with communication capability. In order to communicate with electronic devices adopting different communication techniques, some electronic devices are equipped with multiple communication transceivers. The communication transceivers, however, must be integrated to fit in the limited space of the electronic devices. For example, the wireless LAN transceiver and the Bluetooth transceiver are often integrated in the electronic devices.

The wireless LAN transceiver and the Bluetooth transceiver both transmit and/or receive in the ISM band around 2.4 GHz and there are mutual interferences. To prevent from the degradation, some electronic devices adopt time division multiplexing (TDM) approaches so that only one of the wireless LAN communication and the Bluetooth communication may be performed in a period of time. The TDM approaches, however, may cause the transmission delay and limit the usable time for data transmission.

SUMMARY

An example embodiment of a communication device, comprising: a wireless LAN transceiver, for receiving a first signal in a first frequency band in a first period and for receiving a second signal in the first frequency band in a second period; a Bluetooth transceiver, for receiving a third signal in a second frequency band in the first period and for receiving a fourth signal in a third frequency band in the second period; an oscillator for generating a fifth signal and a sixth signal; a mixer for mixing the third signal and the fifth signal to generate a seventh signal, and for mixing the fourth signal and the sixth signal to generate an eighth signal; a wireless LAN demodulation circuit for demodulating the first signal and the second signal; and a Bluetooth demodulation circuit for demodulating the seventh signal and the eighth signal; wherein the first frequency band locates between a first frequency and a second frequency; the second frequency band locates between a third frequency and a fourth frequency; the third frequency band locates between a fifth frequency and a sixth frequency; the fifth signal and the sixth signal have a seventh frequency and a eighth frequency, respectively; the second frequency is higher than the first frequency; the fourth frequency is higher than third frequency; the seventh frequency is higher than the second frequency; the seventh frequency is lower than or equal to the third frequency; the eighth frequency is lower than or equal to the first frequency; and the eighth frequency is higher than or equal to the sixth frequency.

Another example embodiment of a communication device, for coupling with a wireless LAN transceiver, a Bluetooth transceiver, an oscillator, and a mixer, comprising a control circuit and a Bluetooth demodulation circuit, wherein the control circuit configures the wireless LAN transceiver to receive a first signal in a first frequency band; the control circuit configures the Bluetooth transceiver to receiving a second signal in a second frequency band in a first period and to receive a third signal in a third frequency band in a second period; the control circuit configures the oscillator to generate a fourth signal and a fifth signal; the control circuit configures the mixer to generate a seventh signal by mixing the second signal and the fourth signal and to generate an eighth signal by mixing the third signal and the fifth signal; the Bluetooth demodulation circuit demodulates the seventh signal and the eighth signal; the first frequency band locates between a first frequency and a second frequency; the second frequency band locates between a third frequency and a fourth frequency;

the third frequency band locates between a fifth frequency and a sixth frequency; the fourth signal and the fifth signal have a seventh frequency and an eighth frequency, respectively; the second frequency is higher than the first frequency; the fourth frequency is higher than the third frequency; the sixth frequency is higher than the fifth frequency; the third frequency is higher than or equal to the second frequency; the sixth frequency is lower than or equal to the first frequency; the seventh frequency is higher than or equal to the fourth frequency; and the eighth frequency is lower than or equal to the fifth frequency.

Another example embodiment of a communication device, for coupling with a wireless LAN transceiver, a Bluetooth transceiver, an oscillator, and a mixer, comprising a control circuit and a Bluetooth demodulation circuit, wherein the control circuit configures the wireless LAN transceiver to receive a first signal in a first frequency band; the control circuit configures the Bluetooth transceiver to receiving a second signal in a second frequency band in a first period and to receive a third signal in a third frequency band in a second period; the control circuit configures the oscillator to generate a fourth signal and a fifth signal; the control circuit configures the mixer to generate a seventh signal by mixing the second signal and the fourth signal and to generate an eighth signal by mixing the third signal and the fifth signal; the Bluetooth demodulation circuit demodulates the seventh signal and the eighth signal; the first frequency band locates between a first frequency and a second frequency; the second frequency band locates between a third frequency and a fourth frequency; the third frequency band locates between a fifth frequency and a sixth frequency; the fourth signal and the fifth signal have a seventh frequency and an eighth frequency, respectively; the second frequency is higher than the first frequency; the fourth frequency is higher than the third frequency; the sixth frequency is higher than the fifth frequency; the seventh frequency is higher than or equal to the second frequency; the seven frequency is lower than or equal to the third frequency; the eighth frequency is lower than or equal to the first frequency; and the eighth frequency is higher than or equal to the sixth frequency.

Another example embodiment of a communication device, for coupling with a signal detection circuit, a wireless transceiver, an oscillator, and a mixer, comprising a control circuit and a demodulation circuit, wherein the control circuit configures the detection circuit to detect and to notify that a first frequency band is occupied; the control circuit configures the wireless transceiver to receiving a first signal in a second frequency band in a first period and to receive a second signal in a third frequency band in a second period; the control circuit configures the oscillator to generate a third signal and a fourth signal; the control circuit configures the mixer to generate a fifth signal by mixing the first signal and the third signal and to generate a sixth signal by mixing the second signal and the fourth signal; the demodulation circuit demodulates the fifth signal and the sixth signal; the first frequency band locates between a first frequency and a second frequency; the second frequency band locates between a third frequency and a fourth frequency; the third frequency band locates between a fifth frequency and a sixth frequency; the third signal and the fourth signal have a seventh frequency and an eighth frequency, respectively; the second frequency is higher than the first frequency; the fourth frequency is higher than the third frequency; the sixth frequency is higher than the fifth frequency; the third frequency is higher than or equal to the second frequency; the sixth frequency is lower than or equal to the first frequency; the seventh frequency is higher than or equal to the fourth frequency; and the eighth frequency is lower than or equal to the fifth frequency.

Another example embodiment of a communication device, for coupling with a signal detection circuit, a wireless transceiver, an oscillator, and a mixer, comprising a control circuit and a demodulation circuit, wherein the control circuit configures the detection circuit to detect and to notify that a first frequency band is occupied; the control circuit configures the wireless transceiver to receiving a first signal in a second frequency band in a first period and to receive a second signal in a third frequency band in a second period; the control circuit configures the oscillator to generate a third signal and a fourth signal; the control circuit configures the mixer to generate a fifth signal by mixing the first signal and the third signal and to generate a sixth signal by mixing the second signal and the fourth signal; the demodulation circuit demodulates the fifth signal and the sixth signal; the first frequency band locates between a first frequency and a second frequency; the second frequency band locates between a third frequency and a fourth frequency; the third frequency band locates between a fifth frequency and a sixth frequency; the fourth signal and the fifth signal have a seventh frequency and an eighth frequency, respectively; the second frequency is higher than the first frequency; the fourth frequency is higher than the third frequency; the sixth frequency is higher than the fifth frequency; the seventh frequency is higher than or equal to the second frequency; the seven frequency is lower than or equal to the third frequency; the eighth frequency is lower than or equal to the first frequency; and the eighth frequency is higher than or equal to the sixth frequency.

DETAILED DESCRIPTION

Figure 1:
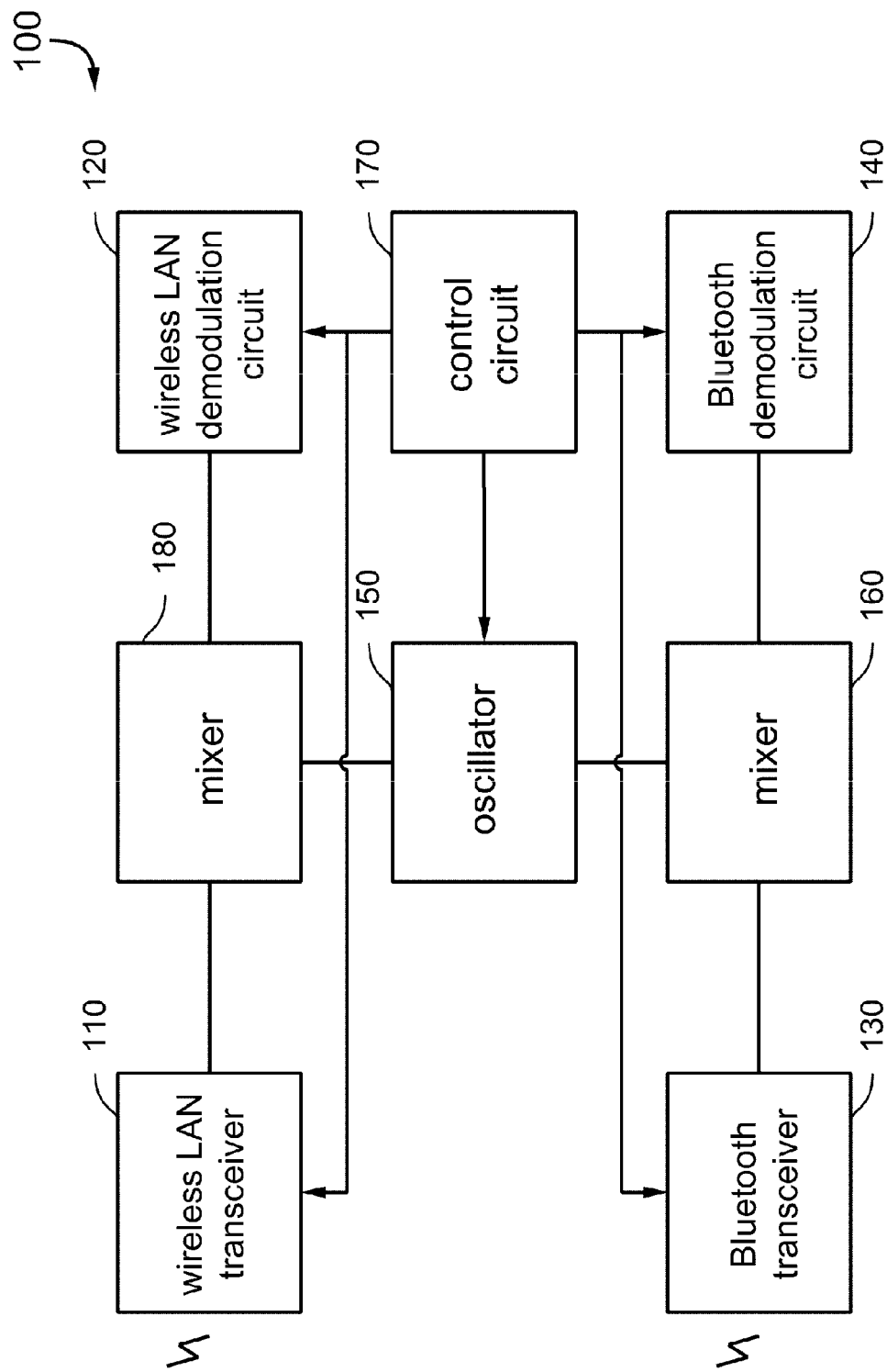
FIG. 1 shows a simplified functional block diagram of an example communication device.

FIG. 1 shows a simplified functional block diagram of an example communication device 100, in accordance with at least some embodiments of the disclosure. The communication device 100 comprises a wireless LAN transceiver 110, a wireless LAN demodulation circuit 120, a Bluetooth transceiver 130, a Bluetooth demodulation circuit 140, an oscillator 150, mixers 160 and 180, and a control circuit 170. In this embodiment, the communication device 100 may simultaneously perform the Bluetooth communication and the IEEE 802.11 series wireless LAN communication.

The wireless LAN transceiver 110 and the Bluetooth transceiver 130 respectively comprise analog signal processing circuits, digital signal processing circuits, and/or one or more antennas for transmitting and/or receiving the wireless LAN signals and the Bluetooth signals in the 2.4 GHz frequency band. For example, the transceivers may respectively comprise a low noise amplifier, a gain control circuit, and a filter circuit.

The oscillator 150 may be realized with a voltage controlled oscillator, a crystal oscillator, and/or other suitable type of oscillators. The oscillator 150 may generate oscillating signals with the required frequency according to the control signal of the control circuit 170.

The mixer 160 may mix the signals generated by the Bluetooth transceiver 140 and the oscillator 150 so as to convert the frequency of the Bluetooth signals from the radio frequency (RF) to the intermediate frequency (IF).

The Bluetooth demodulating circuit 140 may comprise analog signal processing circuits and/or digital signal processing circuits for receiving the mixed signals from the mixer 160 and recovering the mixed signals.

The mixer 180 may mix the signals generated by the wireless LAN transceiver 110 and the oscillator 150, and transmit the mixed signals to the wireless LAN demodulation circuit 120. The wireless LAN demodulation circuit 120 may comprise analog signal processing circuits and/or digital signal processing circuits for receiving the mixed signals of the mixer 180 and recovering the mixed signals.

The control circuit 170 may configure the above components to function at appropriate time so that the communication device 100 may simultaneously perform the wireless LAN communication and the Bluetooth communication.

Figure 2:
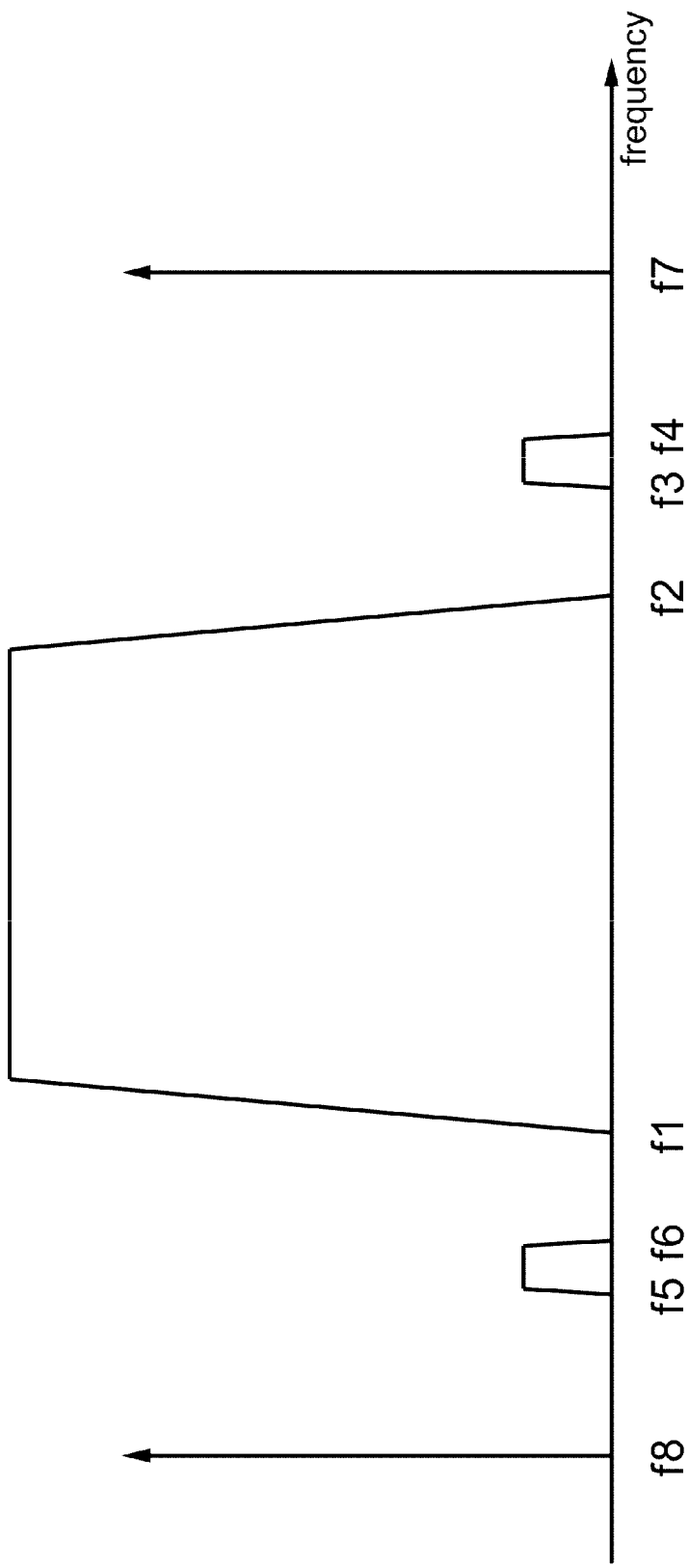
FIG. 2 shows a simplified spectrum of the signals received and generated by the communication device in FIG. 1.

FIG. 2 shows a simplified spectrum of the signals received and generated by the communication device 100 in FIG. 1, in accordance with at least some embodiments of the disclosure. The operation of the communication device 100 is further explained below with FIGS. 1 and 2.

In a period of time T1, the wireless LAN transceiver 110 of the communication device 100 receives a wireless LAN signal S1 in a first frequency band between the frequencies f1 and f2. In a period of time T2, the wireless LAN transceiver 110 receives a wireless LAN signal S2 in the first frequency band. The trapezoid between the frequencies f1 and f2 represents the spectrum mask of the wireless LAN signals S1 and S2. The control circuit 170 configures the wireless LAN demodulation circuit 120 to demodulate the data transmitted by the wireless LAN transmitter from the signals received by the wireless LAN transceiver 110.

In the period of time T1, the Bluetooth transceiver 130 of the communication device 100 also receives a Bluetooth signal S3 in a second frequency band between the frequencies f3 and f4. In the period of time T2, the Bluetooth transceiver 130 receives a Bluetooth signal S4 in a third frequency band between the frequencies f5 and f6. The trapezoid between the frequencies f3 and f4 and between frequencies f5 and f6 represent the spectrum mask of the Bluetooth signals S3 and S4, respectively.

To demodulate the Bluetooth signal S3, the control circuit 170 configures the oscillator 150 to generate an oscillating signal S5 with an oscillating frequency f7. The mixer 160 mixes the Bluetooth signal S3 and the oscillating signal S5 to convert the RF Bluetooth signal S3 into an IF signal S7 so that the IF signal S7 locates between the frequency (f7-f4) and (f7-f3).

To demodulate the Bluetooth signal S4, the control circuit 170 configures the oscillator 150 to generate an oscillating signal S6 with an oscillating frequency f8. The mixer 160 mixes the Bluetooth signal S4 and the oscillating signal S6 to convert the RF Bluetooth signal S4 into an IF signal S8 so that the IF signal S8 locates between the frequency (f5-f8) and (f6-f8). The arrows at the frequencies f7 and f8 represent the oscillating frequencies of the oscillating signals S7 and S8, respectively.

The control circuit 170 further configure the Bluetooth demodulation circuit 140 to demodulate the data transmitted by the Bluetooth transmitter according to the IF signals S7 and S8.

In this embodiment, when the frequency band of the Bluetooth signal received by the communication device 100 is higher than the frequency band of the wireless LAN signal, the control circuit 170 configures the oscillator 150 to generate the oscillating signal with a frequency higher than the frequency band of the Bluetooth signal. Moreover, when the frequency band of the Bluetooth signal received by the communication device 100 is lower than the frequency band of the wireless LAN signal, the control circuit 170 configures the oscillator 150 to generate the oscillating signal with a frequency lower than the frequency band of the Bluetooth signal.

Figure 3:
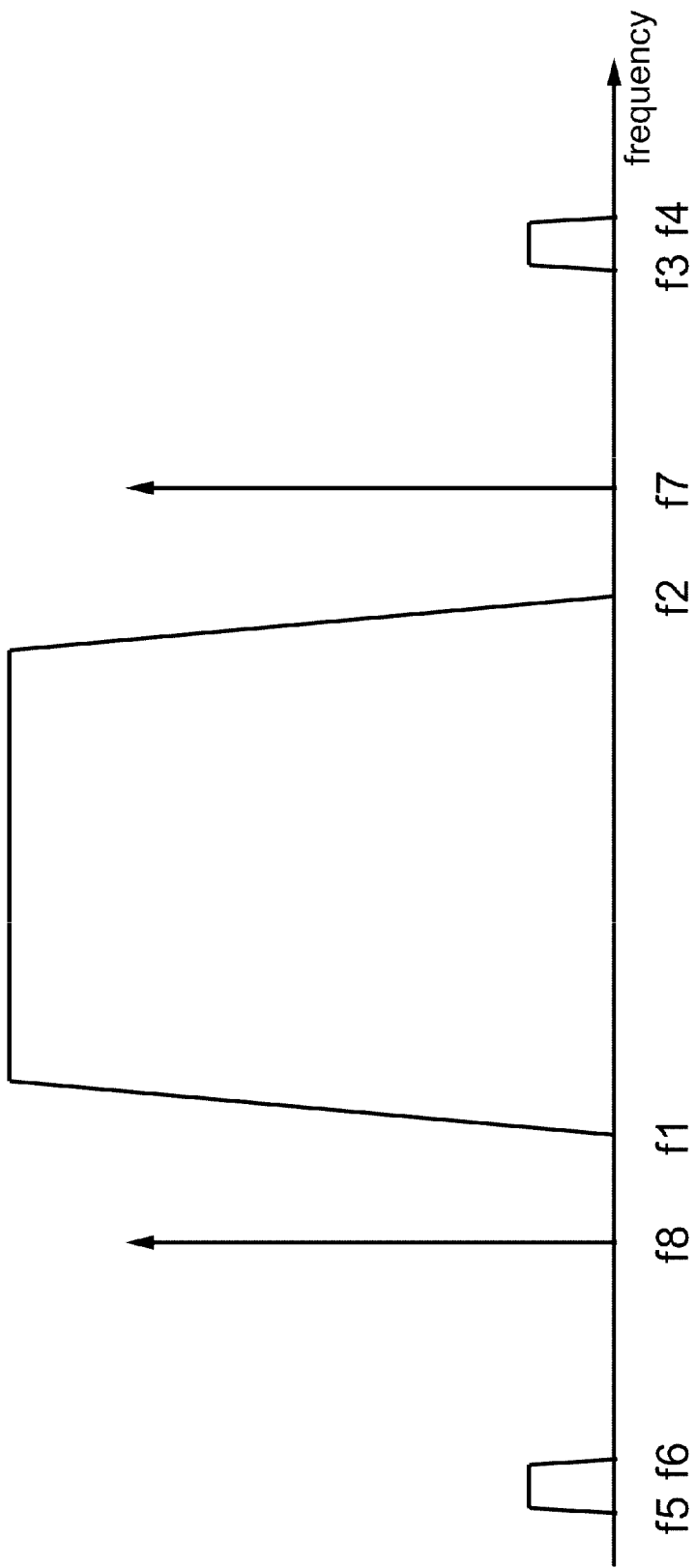
FIG. 3 shows another simplified spectrum of the signals received and generated by the communication device in FIG. 1, all arranged in accordance with at least some embodiments of the disclosure described herein.

FIG. 3 shows another simplified spectrum of the signals received and generated by the communication device 100 in FIG. 1, in accordance with at least some embodiments of the disclosure. The operation of the communication device 100 is further explained below with FIGS. 1 and 3.

In the periods of time U1 and U2, the wireless transceiver 110 respectively receives wireless LAN signals V1 and V2, both locate in the first frequency band between the frequencies f1 and f2. The control circuit 170 configures the wireless demodulation circuit 120 to demodulate the data transmitted by the wireless LAN transmitter. The trapezoid between the frequencies f1 and f2 represents the spectrum mask of the wireless LAN signals V1 and V2.

In the period of time U1, the Bluetooth transceiver 130 of the communication device 100 also receives a Bluetooth signal V3 in the second frequency band between the frequencies f3 and f4. In the period of time U2, the Bluetooth transceiver 130 receives a Bluetooth signal V4 in the third frequency band between the frequencies f5 and f6. The trapezoid between the frequencies f3 and f4 and between frequencies f5 and f6 represent the spectrum mask of the Bluetooth signals V3 and V4, respectively.

To demodulate the Bluetooth signal V3, the control circuit 170 configures the oscillator 150 to generate an oscillating signal V5 with an oscillating frequency f7. The mixer 160 mixes the Bluetooth signal V3 and the oscillating signal V5 to convert the RF Bluetooth signal V3 into an IF signal V7 so that the IF signal V7 locates between the frequency (f3-f7) and (f4-f7).

To demodulate the Bluetooth signal V4, the control circuit 170 configures the oscillator 150 to generate an oscillating signal V6 with an oscillating frequency f8. The mixer 160 mixes the Bluetooth signal V4 and the oscillating signal V6 to convert the RF Bluetooth signal V4 into an IF signal V8 so that the IF signal V8 locates between the frequency (f8-f6) and (f8-f5). The arrows at the frequencies f7 and f8 represent the oscillating frequencies of the oscillating signals V7 and V8, respectively.

The control circuit 170 further configure the Bluetooth demodulation circuit 140 to demodulate the data transmitted by the Bluetooth transmitter according to the IF signals V7 and V8.

In this embodiment, when the frequency band of the Bluetooth signal received by the communication device 100 is higher than the frequency band of the wireless LAN signal, the control circuit 170 configures the oscillator 150 to generate the oscillating signal with a frequency lower than the frequency band of the Bluetooth signal. Moreover, when the frequency band of the Bluetooth signal received by the communication device 100 is lower than the frequency band of the wireless LAN signal, the control circuit 170 configures the oscillator 150 to generate the oscillating signal with a frequency higher than the frequency band of the Bluetooth signal.

In the embodiments above, the communication device 100 transmits and receives wireless LAN signals in all of the periods of time T1, T2, U1, and U2. In other embodiments, the communication device 100 may transmit and receive wireless LAN signals in only one of the periods of time T1 and T2 or in one of the periods of time U1 and U2.

In the embodiments above, the frequencies f1~f6 may be properly chosen according to different design considerations and the oscillator 150 may generate suitable oscillating signals accordingly. For example, the frequencies f1 and f2 may be configured to be 11 MHz away from the center frequency of the wireless LAN channel (or 20 MHz away from each other) so that the wireless LAN signals have at least −20 dBr attenuation at the frequencies f1 and f2. In other embodiments, the frequencies f1 and f2 may be configured to be 20 MHz or 30 MHz away from the center frequency of the wireless LAN channel so that the wireless LAN signals have at least −28 dBr and −40 dBr attenuation at the frequencies f1 and f2, respectively. In other embodiments, the frequency bandwidth for the Bluetooth communication, e.g., the second frequency band and the third frequency band mentioned above, may be configured to be 1 MHz or other suitable bandwidths.

In other embodiments, the wireless LAN transceiver 110 of the communication device 100 may receive signals from a frequency band greater than the bandwidth of the first frequency band above, and filter out the required signals with filter circuits or other signal processing circuits. The Bluetooth transceiver 130 of the communication device 100 may also receive signals from a frequency band greater than the bandwidth of the second frequency band or the third frequency band above, and filter out the required signals with filter circuits or other signal processing circuits. For example, in FIG. 2, the Bluetooth transceiver 130 may receive the signals between the frequencies f8 and f6, and filter out the required signals between the frequencies f5 and f6 with filter circuits or other signal processing circuits.

In other embodiments, the communication device 100 only comprises part of communication capabilities mentioned above. For example, the communication device 100 is mainly used for Bluetooth communication and comprises part of the function of the wireless LAN transceiver 110, the mixer 180 and the wireless demodulation circuit 120. The communication device 100 may detect the frequency band used for wireless LAN communications and configure the oscillator 150 to generate appropriate oscillating signals with an oscillating frequency outside the frequency band of the wireless LAN signal. Thus, the interference of the wireless LAN signals on the Bluetooth communication from may be reduced.

In other embodiments, the communication device 100 further comprises a signal detection circuit for detecting the frequency occupied by other electronic devices and notifying the control circuit 170 which frequency has been occupied. The control circuit 170 may configure the oscillator 150 to generate appropriate oscillating signals outside the occupied frequency band for demodulating the received Bluetooth signals so that the influence from other electronic devices on the Bluetooth communication from may be reduced.

In other embodiments, the communication device 100 may also adopt other signal processing techniques in combination with the approaches in the disclosure to reduce the interferences between the wireless LAN communication and the Bluetooth communication.

In the above embodiments, the control circuit 170 configures the oscillator 150 so that the frequencies of the generated oscillating signals do not locate in the frequency band of the wireless LAN signals. Therefore, the RF Bluetooth signals may be converted into the IF signals with reduced interference from the wireless LAN signals. The communication quality and system performance may be enhanced. Furthermore, the control signal 170 may adequately configure the oscillator to generate the oscillating signal with the required oscillating frequency according to the communication channels of the Bluetooth signals and the wireless LAN signals so that the usable channel number of the Bluetooth communication may be increased.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication device, comprising:
   a wireless LAN transceiver, for receiving a first signal in a first frequency band in a first period and for receiving a second signal in the first frequency band in a second period;
   a Bluetooth transceiver, for receiving a third signal in a second frequency band in the first period and for receiving a fourth signal in a third frequency band in the second period;
   an oscillator for generating a fifth signal and a sixth signal;
   a mixer for mixing the third signal and the fifth signal to generate a seventh signal, and for mixing the fourth signal and the sixth signal to generate an eighth signal;
   a wireless LAN demodulation circuit for demodulating the first signal and the second signal; and
   a Bluetooth demodulation circuit for demodulating the seventh signal and the eighth signal;
   wherein the first frequency band locates between a first frequency and a second frequency; the second frequency band locates between a third frequency and a fourth frequency; the third frequency band locates between a fifth frequency and a sixth frequency; the fifth signal and the sixth signal have a seventh frequency and a eighth frequency, respectively; the second frequency is higher than the first frequency; the fourth frequency is higher than third frequency; the sixth frequency is higher than the fifth frequency; the third frequency is higher than or equal to the second frequency; the sixth frequency is lower than or equal to the first frequency; the seventh frequency is higher than or equal to the fourth frequency; and the eighth frequency is lower than or equal to the fifth frequency.

2. The communication device of claim 1, wherein the first frequency and the second frequency are separated by at least 20 MHz.

3. The communication device of claim 1, wherein the third frequency and the fourth frequency are separated by 1 MHz, and the fifth frequency and the sixth frequency are separated by 1 MHz.

4. A communication device, comprising:
   a wireless LAN transceiver, for receiving a first signal in a first frequency band in a first period and for receiving a second signal in the first frequency band in a second period;
   a Bluetooth transceiver, for receiving a third signal in a second frequency band in the first period and for receiving a fourth signal in a third frequency band in the second period;
   an oscillator for generating a fifth signal and a sixth signal;
   a mixer for mixing the third signal and the fifth signal to generate a seventh signal, and for mixing the fourth signal and the sixth signal to generate an eighth signal;
   a wireless LAN demodulation circuit for demodulating the first signal and the second signal; and
   a Bluetooth demodulation circuit for demodulating the seventh signal and the eighth signal;
   wherein the first frequency band locates between a first frequency and a second frequency; the second frequency band locates between a third frequency and a fourth frequency; the third frequency band locates between a fifth frequency and a sixth frequency; the fifth signal and the sixth signal have a seventh frequency and a eighth frequency, respectively; the second frequency is higher than the first frequency; the fourth frequency is higher than third frequency; the seventh frequency is higher than the second frequency; the seventh frequency is lower than or equal to the third frequency; the eighth frequency is lower than or equal to the first frequency; and the eighth frequency is higher than or equal to the sixth frequency.

5. The communication device of claim 4, wherein the first frequency and the second frequency are separated by at least 20 MHz.

6. The communication device of claim 4, wherein the third frequency and the fourth frequency are separated by 1 MHz, and the fifth frequency and the sixth frequency are separated by 1 MHz.

7. A communication device, for coupling with a wireless LAN transceiver, a Bluetooth transceiver, an oscillator, and a mixer, comprising a control circuit and a Bluetooth demodulation circuit, wherein the control circuit configures the wireless LAN transceiver to receive a first signal in a first frequency band;

the control circuit configures the Bluetooth transceiver to receiving a second signal in a second frequency band in a first period and to receive a third signal in a third frequency band in a second period;

the control circuit configures the oscillator to generate a fourth signal and a fifth signal;

the control circuit configures the mixer to generate a seventh signal by mixing the second signal and the fourth signal and to generate an eighth signal by mixing the third signal and the fifth signal;

the Bluetooth demodulation circuit demodulates the seventh signal and the eighth signal;

the first frequency band locates between a first frequency and a second frequency;

the second frequency band locates between a third frequency and a fourth frequency;

the third frequency band locates between a fifth frequency and a sixth frequency;

the fourth signal and the fifth signal have a seventh frequency and an eighth frequency, respectively;

the second frequency is higher than the first frequency;

the fourth frequency is higher than the third frequency;

the sixth frequency is higher than the fifth frequency;

the third frequency is higher than or equal to the second frequency;

the sixth frequency is lower than or equal to the first frequency;

the seventh frequency is higher than or equal to the fourth frequency; and the eighth frequency is lower than or equal to the fifth frequency.

8. The communication device of claim 7, wherein the first frequency and the second frequency are separated by at least 20 MHz.

9. The communication device of claim 7, wherein the third frequency and the fourth frequency are separated by 1 MHz, and the fifth frequency and the sixth frequency are separated by 1 MHz.

10. A communication device, for coupling with a wireless LAN transceiver, a Bluetooth transceiver, an oscillator, and a mixer, comprising a control circuit and a Bluetooth demodulation circuit, wherein the control circuit configures the wireless LAN transceiver to receive a first signal in a first frequency band;

the control circuit configures the Bluetooth transceiver to receiving a second signal in a second frequency band in a first period and to receive a third signal in a third frequency band in a second period;

the control circuit configures the oscillator to generate a fourth signal and a fifth signal;

the control circuit configures the mixer to generate a seventh signal by mixing the second signal and the fourth signal and to generate an eighth signal by mixing the third signal and the fifth signal;

the Bluetooth demodulation circuit demodulates the seventh signal and the eighth signal;

the first frequency band locates between a first frequency and a second frequency;

the second frequency band locates between a third frequency and a fourth frequency;

the third frequency band locates between a fifth frequency and a sixth frequency;

the fourth signal and the fifth signal have a seventh frequency and an eighth frequency, respectively;

the second frequency is higher than the first frequency;

the fourth frequency is higher than the third frequency;

the sixth frequency is higher than the fifth frequency;

the seventh frequency is higher than or equal to the second frequency;

the seventh frequency is lower than or equal to the third frequency;

the eighth frequency is lower than or equal to the first frequency; and the eighth frequency is higher than or equal to the sixth frequency.

11. The communication device of claim 10, wherein the first frequency and the second frequency are separated by at least 20 MHz.

12. The communication device of claim 10, wherein the third frequency and the fourth frequency are separated by 1 MHz, and the fifth frequency and the sixth frequency are separated by 1 MHz.

13. A communication device, for coupling with a signal detection circuit, a Bluetooth transceiver, an oscillator, and a mixer, comprising a control circuit and a Bluetooth demodulation circuit, wherein the control circuit configures the detection circuit to detect and to notify that a first frequency band is occupied;

the control circuit configures the Bluetooth transceiver to receiving a first signal in a second frequency band in a first period and to receive a second signal in a third frequency band in a second period;

the control circuit configures the oscillator to generate a third signal and a fourth signal;

the control circuit configures the mixer to generate a fifth signal by mixing the first signal and the third signal and to generate a sixth signal by mixing the second signal and the fourth signal;

the Bluetooth demodulation circuit demodulates the fifth signal and the sixth signal;

the first frequency band locates between a first frequency and a second frequency;

the second frequency band locates between a third frequency and a fourth frequency;

the third frequency band locates between a fifth frequency and a sixth frequency;

the third signal and the fourth signal have a seventh frequency and an eighth frequency, respectively;

the second frequency is higher than the first frequency;

the fourth frequency is higher than the third frequency;

the sixth frequency is higher than the fifth frequency;

the third frequency is higher than or equal to the second frequency;

the sixth frequency is lower than or equal to the first frequency;

the seventh frequency is higher than or equal to the fourth frequency; and the eighth frequency is lower than or equal to the fifth frequency.

14. The communication device of claim 13, wherein the first frequency and the second frequency are separated by at least 20 MHz.

15. The communication device of claim 13, wherein the third frequency and the fourth frequency are separated by 1 MHz, and the fifth frequency and the sixth frequency are separated by 1 MHz.

16. A communication device, for coupling with a signal detection circuit, a Bluetooth transceiver, an oscillator, and a mixer, comprising a control circuit and a Bluetooth demodulation circuit, wherein the control circuit configures the detection circuit to detect and to notify that a first frequency band is occupied;

the control circuit configures the Bluetooth transceiver to receiving a first signal in a second frequency band in a first period and to receive a second signal in a third frequency band in a second period;

the control circuit configures the oscillator to generate a third signal and a fourth signal;

the control circuit configures the mixer to generate a fifth signal by mixing the first signal and the third signal and to generate a sixth signal by mixing the second signal and the fourth signal;

the Bluetooth demodulation circuit demodulates the fifth signal and the sixth signal;

the first frequency band locates between a first frequency and a second frequency;

the second frequency band locates between a third frequency and a fourth frequency;

the third frequency band locates between a fifth frequency and a sixth frequency;

the fourth signal and the fifth signal have a seventh frequency and an eighth frequency, respectively;

the second frequency is higher than the first frequency;

the fourth frequency is higher than the third frequency;

the sixth frequency is higher than the fifth frequency;

the seventh frequency is higher than or equal to the second frequency;

the seventh frequency is lower than or equal to the third frequency;

the eighth frequency is lower than or equal to the first frequency; and the eighth frequency is higher than or equal to the sixth frequency.

17. The communication device of claim 16, wherein the first frequency and the second frequency are separated by at least 20 MHz.

18. The communication device of claim 16, wherein the third frequency and the fourth frequency are separated by 1 MHz, and the fifth frequency and the sixth frequency are separated by 1 MHz.

* * * * *